US007451102B2

(12) United States Patent
Nowak

(10) Patent No.: US 7,451,102 B2
(45) Date of Patent: Nov. 11, 2008

(54) ORDERING METHOD UTILIZING INSTANT MESSAGING

(75) Inventor: Keith B. Nowak, Red Bank, NJ (US)

(73) Assignee: Shadow Enterprises Inc., Sea Bright, NJ (US)

( * ) Notice: Subject to any disclaimer, the term of this patent is extended or adjusted under 35 U.S.C. 154(b) by 0 days.

(21) Appl. No.: 11/508,137

(22) Filed: Aug. 22, 2006

(65) Prior Publication Data

US 2007/0016490 A1 Jan. 18, 2007

Related U.S. Application Data

(63) Continuation-in-part of application No. PCT/US2005/026089, filed on Jul. 25, 2005.

(60) Provisional application No. 60/686,897, filed on Jun. 3, 2005.

(51) Int. Cl.
G06Q 30/00 (2006.01)
(52) U.S. Cl. .................................................. 705/26
(58) Field of Classification Search .................. 705/26, 705/27
See application file for complete search history.

(56) References Cited

U.S. PATENT DOCUMENTS

| 4,797,818 | A | | 1/1989 | Cotter |
| 6,000,832 | A | * | 12/1999 | Franklin et al. ............. 700/232 |
| 6,434,536 | B1 | | 8/2002 | Geiger |
| 6,597,769 | B2 | | 7/2003 | Snow |
| 6,736,322 | B2 | | 5/2004 | Gobburu et al. |
| 6,980,963 | B1 | * | 12/2005 | Hanzek ........................ 705/26 |
| 7,020,624 | B2 | * | 3/2006 | Hsuan ......................... 705/26 |
| 2001/0049636 | A1 | * | 12/2001 | Hudda et al. ................. 705/26 |
| 2002/0013734 | A1 | | 1/2002 | Bueno |
| 2002/0038261 | A1 | | 3/2002 | Kargman et al. |
| 2002/0116240 | A1 | * | 8/2002 | Hsuan ........................... 705/7 |
| 2002/0143638 | A1 | | 10/2002 | August et al. |

(Continued)

FOREIGN PATENT DOCUMENTS

WO    WO 03056478    7/2003

OTHER PUBLICATIONS

Author unknown, "IM Trading Solutions Goes After Middle Market," Wall Street Letter, New York, Mar. 14, 2005, p. 1.*

(Continued)

Primary Examiner—Yogesh C. Garg
Assistant Examiner—Amee A Shah
(74) Attorney, Agent, or Firm—Keith D. Nowak

(57) ABSTRACT

A system and method for a consumer to order goods and/or services from a vendor through use of an instant messaging service. The consumer initiates an instant message communication link between the consumer and the vendor by using the vendor's screen name which has been added to the consumer's list of contacts and sending an initiating message. Software resident on the vendor's computer responds to initiation of the instant message communication link by supplying a list of good and/or services to the consumer. The consumer can order from the list of goods and/or services while concurrently communicating with the vendor. An order identification number is created each time an order is placed which includes information from the consumer's screen name, the vendor's screen name and software generated information. The order identification number uniquely identifies the order and is used only once.

8 Claims, 21 Drawing Sheets

U.S. PATENT DOCUMENTS

| | | | |
|---|---|---|---|
| 2002/0178087 A1* | 11/2002 | Henderson et al. | 705/26 |
| 2002/0198790 A1 | 12/2002 | Paulo et al. | |
| 2003/0065565 A1 | 4/2003 | Wagner et al. | |
| 2003/0074410 A1 | 4/2003 | Kay et al. | |
| 2003/0126016 A1 | 7/2003 | Asano | |
| 2003/0167208 A1 | 9/2003 | La Mastro et al. | |
| 2004/0030611 A1 | 2/2004 | Byrne | |
| 2004/0039660 A1 | 2/2004 | Prescott | |
| 2004/0039661 A1 | 2/2004 | Fuzell-Casey et al. | |
| 2004/0044579 A1 | 3/2004 | Leutze et al. | |
| 2004/0107144 A1 | 6/2004 | Short | |
| 2004/0215526 A1 | 10/2004 | Luo et al. | |
| 2004/0224693 A1 | 11/2004 | O'Neal | |
| 2005/0004995 A1* | 1/2005 | Stochosky | 709/219 |
| 2005/0021445 A1 | 1/2005 | Caro | |
| 2005/0177437 A1* | 8/2005 | Ferrier | 705/26 |
| 2005/0177518 A1 | 8/2005 | Brown | |
| 2005/0222915 A1 | 10/2005 | Wilson, Jr. et al. | |
| 2005/0222917 A1 | 10/2005 | Moore | |
| 2006/0026076 A1 | 2/2006 | Raymond | |
| 2006/0026091 A1 | 2/2006 | Keen et al. | |
| 2007/0043823 A1* | 2/2007 | George et al. | 709/207 |
| 2007/0168205 A1* | 7/2007 | Carlson et al. | 705/1 |
| 2007/0168431 A1* | 7/2007 | Lyle et al. | 709/206 |

OTHER PUBLICATIONS

Unknown Author, "Revised: Gap Helps Customers Give the Favorite Gifts of the Season," PR Newswire, New York, Nov. 14, 2005, p. 1.*
Angwin, Julia, "AOL Hopes to Steer Message-System Fans To Its Web-Site Ads," Wall Street Journal (Eastern edition), New York, N.Y., Nov. 22, 2005, p. B.1.*
http://www.campusfood.com/cf_privacy.asp.
http://www.iwantatakeaway.co.uk/restaurant/faq.php.
http://www.getmobo.com.
http://www.businesstown.com/internet/profile-three.asp.
http://www.waiter.com/wwwsys/pr/about.html.
http://www.bizjournals.com/boston/staices/1000/10/09/stay2.html.
www.IMDining.com, click "Pete's Pizzeria", click "7News Boston".

* cited by examiner

IMS order form— Microsoft Internet Explorer

File Edit View Favorites Tools Help    eFax

Back • ⊕ ☐ ☐ ◇ Search ☆Favorites ⊙ ⊠ ◇ ☐ • ☐ 📧 ☆ 🗐 📇 ☺

Address http://www.imdining.com/ms/Menu.aspx?f=4f3e23d-9622-63fd7e7b1da1    ▶ 🗔 Go

POWERED BY

🅘 Dining

ANGORA CAFE ✱
gourmet services

The best frozen yogurt
wraps, rollups, gourmet
coffee in Boston, MA.

Hours
Mon–Sat
6am–12:00am
Sun
9am–12:00am

Delivery & Pickup
Boston Univ. Area
All Categories
+ Beverages
+ Frozen Yogurt
+ Pit Roll Ups
+ Pizza
+ Salads
+ Sandwiches
+ Smoothies Salads All salads served with fresh pita bread and choice of dressing Chef's Salad
Our tossed salad topped with smoked turkey, ham and
mozzarella cheese          $5.95   add special Greek Salad
Our tossed salad topped with feta cheese and black olives,
served with Greek dressing    $4.95   add special Grilled Veggie Salad
Grilled zucchini, broccoli and peppers served with fresh
tomatoes on greens          $5.45   add special Make Your Own Salad          $5.70   add special Tomato and Fresh Mozzarella Salad
Fresh buffalo mozzarella, tomatoes and red onions marinated
with olive oil, basil and lemon juice    $5.65   add special CURRENT ORDER
Pickup    Delivery ☐ 1  Mineral Water                   $1.43 [x]
☐ 1  mediterranean large —163        $14.95 [x]
☐ 1  Tossed Salad —164               $4.45 [x]

3 Items, total amount due            $20.83

[Update]    [Submit Order]

Done                                 Internet

IMS order form— Microsoft Internet Exploroer
File  Edit  View  Favorites  Tools  Help      eFax Back ▾  ⊕  ☐  ◇  ☐  🔍Search  ⭐Favorites  ⊙  ⬙  ▾  ☐  ▾  ☐  🗐  ☆  🖼  🐾  ☺
🔲RoboForm▾ search ▸  Logins▾☆(passcards) 🏠mb-business 🏠mb-Home☆Save ○Generate
Address  http://www.imdining.com/ms/Menu.aspx?cmd=orderok     ▸ 🔁Go POWERED BY       ANGORA CAFE 🗙                The best frozen yogurt
 ⟳ Dining        gourmet services              wraps, rollups, gourmet
                                               coffee in Boston, MA.

Hours
Mon–Sat                                        CURRENT ORDER
6am–12:00am                                    Pickup    Delivery
Sun                                                Thanks!
9am–12:00am       Mineral Water       1 = $1.43 =
Delivery & Pickup                            $1.43
Boston Univ. Area                                Your order of 3 items for $20.83
All Categories    Mediterranean large 1 = $14.95 =      is currently in progress!
+ Beverages                                  $14.95
+ Frozen Yogurt   Tossed Salad        1 = $4.45 =
+ Pit Roll Ups                               $4.45    Please close this window and an instant message will be sent
+ Pizza                                                       to indicate the estimated time for your order.
+ Salads
+ Sandwiches
+ Smoothies Done                                                                              Internet

ORDERING METHOD UTILIZING INSTANT MESSAGING

CROSS REFERENCE TO RELATED APPLICATIONS

This application is a continuation-in-part application of International Application No. PCT/U.S.05/26089 filed Jul. 25, 2005 which claims priority to provisional patent application No. 60/686,897 filed Jun. 3, 2005.

FIELD OF THE INVENTION

This invention relates to a method for a consumer to order goods and/or services from a vendor and, more particularly, to an ordering method that utilizes an instant messaging service to directly communicate between a consumer and a specific vendor to place an order.

BACKGROUND OF THE INVENTION

Instant Messaging ("IM") has become one of the most popular ways of communicating over the Internet, replacing the use of e-mail in some applications. With e-mail or other communication services, such as fax, a user generally has no way of knowing if the entity to whom the user is sending the e-mail or fax is actually receiving the message. Lacking an immediate response a user cannot be sure if the desired recipient is present to receive the message or if the message was actually received at the desired location. This lack of an immediate response to an urgent communication is especially important when ordering goods and/or services that require fast delivery. For example, replacement parts for critical equipment and particular services needed in an emergency situation may require an immediate and direct communication between a consumer and a vendor. Another example is ordering food from a restaurant for take out or delivery where availability of particular items and on-time performance may be very important to the consumer and the vendor hoping for repeat business.

A known method for direct and immediate communication between a consumer and a vendor is the traditional telephone. However, in the context of ordering food for example the use of the telephone has significant drawbacks. At the restaurant end an employee must be available to man the phones at all times. During peak ordering periods multiple employees may be required, substantially increasing overhead. The very nature of a verbal communications link between the consumer and the restaurant leads to errors in the order, delivery location errors and lack of security when sending credit card information. Also, for some consumers who may be distracted or unsure of what to order, the taking of an order may take a substantial amount of time which disrupts the entire food delivery process. At the consumer end busy signals or no answer calls are a significant annoyance as well as mistakes in the order, incorrect delivery times, etc. These same drawbacks exist in other areas requiring fast delivery and error free ordering as well as in restaurant delivery situations.

It is, therefore, an object of the present invention to provide an ordering system and method which allows direct and immediate contact between a vendor and a consumer.

It is another object of the present invention to provide an ordering system and method which is fast and accurate both for the consumer and the vendor.

Various other Internet based methods and systems exist for ordering goods and/or services in addition to the telephone. For example, in the restaurant pick up and delivery market Campus Foods.com allows a consumer to log on to a Campus Foods website and choose items from a restaurant menu. The consumer's order is sent directly to Campus Foods and Campus Foods generates a fax listing the items ordered by the consumer which is faxed to the restaurant. The consumer's order is generally confirmed by e-mail. There is no direct contact between the consumer and the restaurant; so, if errors occur, the consumer must re-contact Campus Foods or call the restaurant.

Lack of direct contact also requires that delivery times be estimated. Although this fax based ordering system has advantages over the basic telephone, it still has certain drawbacks due to the lack of direct contact between the consumer and the restaurant.

U.S. Patent Publication No. 200210198790A1 describes a system and method for ordering goods and/or services where a user registers with an order server to store information relating to the user's preferences and stores personal information such as address, credit card information, etc. A consumer order is directed to the server and a vendor for the chosen items is selected based on the stored preferences. This method also suffers from the same drawbacks set forth above due to the lack of direct and immediate contact between the consumer and the vendor.

U.S. Patent Publication No. 2006/0026076A1 describes an on-line ordering system for a retail establishment including a restaurant. A user enters a URL into a browser to locate a first web page which may include a list of restaurants. The user selects a restaurant and receives a second web page which may include a menu. Items are selected and entered along with contact information and payment information and a response is sent to the user after an order is placed. Order information is sent to a server and from there directly to a credit card authorization terminal associated with the restaurant.

This publication generally describes a basic on line ordering system. Although it has advantages over the system described above, it does not offer the flexibility and ease of use for the consumer and the vendor that is inherent with use of the invention described herein.

It is, therefore, a further object of the present invention to provide an ordering system and method which is fast, accurate and easy to use for the consumer and the vendor, provides direct contact between the consumer and the vendor and takes advantage of the communication features available with instant messaging services.

SUMMARY OF INVENTION

In accordance with the invention there is provided a method for a consumer to order goods and/or services from a vendor through use of an instant messaging service. The vendor signs on with an instant messaging service and selects a unique vendor name to identify the particular vendor. A consumer can then add the vendor name to the consumer's list of contacts, which defines to whom the consumer wishes to communicate with via the instant messaging service.

It is a feature of the invention that the consumer initiates an instant message communication link between the consumer and the vendor by utilizing the vendor name which has been added to the consumer's list of contacts and sending an initiating message to the vendor.

It is another feature of the invention that software resident on a vendor's computer responds to the initiation of the instant message communication link with the consumer by supplying a list of goods and/or services to the consumer, which list is displayed on the consumer's computer.

It is a further feature of the invention that the consumer can select from the displayed list by clicking on desired items and generate an order by submitting a list of selected items to the vendor, while concurrently communicating with the vendor.

It is still another feature of the invention that the vendor confirms the order from the consumer in response to the receipt of the list of items selected by the consumer by transmitting a confirming message to the consumer via the instant message communication link.

It is a still further feature of the invention that an order identification number is created each time an order is placed. The order identification number references information from a user's screen name, a vendor's screen name and software generated information to uniquely identify the order currently being processed by the vendor's software.

The above objects and features of the present invention will be described in greater detail in the following detailed description of the invention when taken in conjunction with the accompanying drawings.

DETAILED DESCRIPTION

Figure 1:
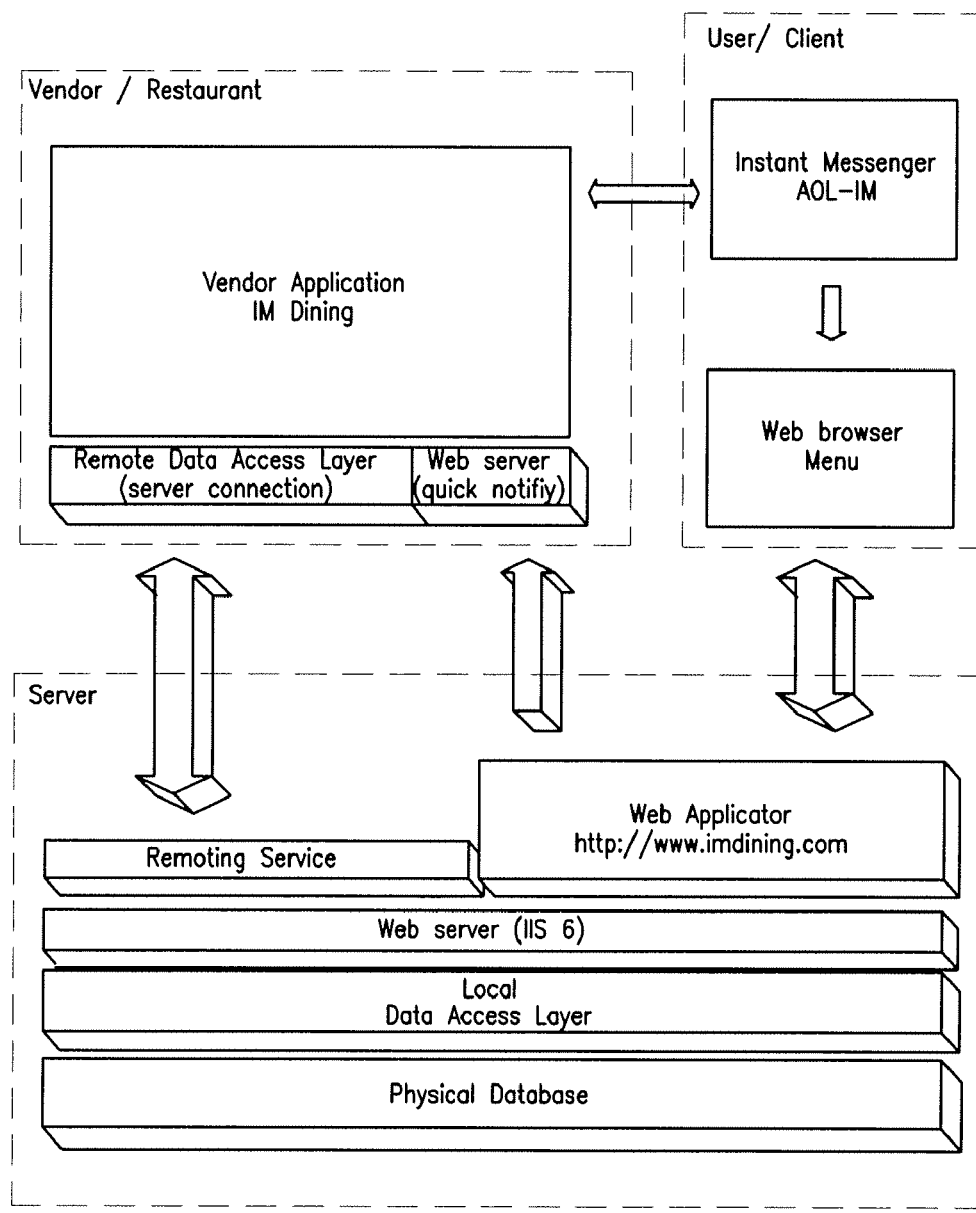
FIG. 1 illustrates an architectural overview and design of the main software components for use with the present invention.

Numerous Instant Messaging ("IM") systems are currently in use including, but not limited to the IM systems available from AMERICA ONLINE (AOL), YAHOO, GOOGLE and others. Basically, all the IM systems operate in a similar manner. An IM user goes on line and connects to a server provided by the IM service provider. Log In is accomplished by entering the user's name and a previously chosen password, at which time the server obtains the connection information which identifies the user's computer. The server also provides the user a list of the user's previously created contact list. The service provider AOL calls this contact list a "Buddy List" and the other service providers have their own designations for the contact list. This list will be referred to herein as a contact list, a Buddy List, or a name list.

Once the user is logged in, the server creates a temporary file that contains the contact information for the user and the contact information for the other entities on the user's contact list. The server then checks to see if anyone from the user's contact list is on line, and if so, notifies the user who from their contact list is on line by displaying an icon on the user's computer. For the AOL instant messaging service this icon is referred to as a "screen name," which will be used herein. To contact a particular entity on the user's contact list the user clicks on the appropriate icon showing who is on line and a communication channel is initiated between the user and the designated entity.

In a conventional instant messaging system the two parties can then type messages to each other which immediately appear on their respective computer screens. The communication channel directly connects the two parties so that each party can instantly communicate with each other. It is to be understood that the present invention will operate with known instant messaging systems in accordance with the basic description set forth above.

The present invention is directed to an ordering system that takes full advantage of the communication capabilities of instant messaging. An important aspect of the invention from the consumer's side is the ability to add one or more vendors to the consumer's instant messaging contact list and gain access to a complete listing of all the goods and/or services offered by that vendor with a single "click" on the contact list icon followed by an initiation message. In accordance with one aspect of the invention, specific goods and/or services previously highlighted by the consumer ("favorites list") can be ordered with one additional click or items can be chosen from the listing provided by the vendor. There are no busy signals or dropped calls as with telephone systems and order errors can be immediately resolved due to the direct connection with the vendor as opposed to web site ordering.

An important aspect of the invention from the vendor's side is the use of custom software at the vendor's location which allows the vendor to immediately provide, to the consumer, a complete listing of goods and/or services it has available as soon as the consumer clicks on the vendor's name included in the consumer's IM contact list. Due to the direct IM connection between the vendor and the consumer, order changes, order confirmation, order correction, delivery information, etc. can be immediately sent or received by either party.

In contrast to telephone ordering systems, the vendor does not need additional employees during busy periods as the custom software provided to the vendor can accept essentially an unlimited amount of nearly simultaneous orders readily processed with only one or two mouse clicks. Also, as the customer's order is printed at the vendor's location, order errors are essentially eliminated.

In contrast to web based ordering systems, the vendor can initiate a direct and immediate IM conversation directly with the consumer to answer questions about his goods or services which are simultaneously being displayed to the consumer. Also, as the custom software resides on the vendor's computer, the vendor can readily make changes to the list of goods and services, add specials, change pricing, offer rewards, etc., all from his computer.

As will be described in greater detail below, the basic operation of the inventive ordering system consists of the following steps:

1) A vendor of goods and/or services signs on with an instant messaging service and provides the instant messaging service with a unique name to identify the particular vendor. This unique name is called a screen name with AOL instant messaging. This screen name will be utilized by the user of the ordering system. As used herein, the term user customer or consumer is interchangeable and the term vendor name or screen name is interchangeable.

2) The unique vendor name is then supplied to potential users of the inventive ordering system. The user adds this name to his contact list on an instant messaging system of choice. The contact list is identified as a "Buddy List" for an AOL instant messaging system.

3) The user/consumer initiates IM contact with the vendor who supplied the vendor name by clicking on the vendor name showing on his contact list and sending an initiation message to the vendor which opens the IM communication channel between the vendor and the user. The initiation message can be any transmission from the user's computer including a simple message such as hitting the space key and then the enter key.

4) Software is provided to the vendor which responds to the initiation message sent via the instant messaging communication channel by supplying a list of goods and/or services which are available from the identified vendor, which list is sent directly to the user and is displayed on the user's computer screen.

5) The user can then select items from the vendor's list of goods and/or services and transmit the order back to the vendor. The vendor can then confirm the order, print out the order at the vendor's facility and arrange for the transfer of goods and/or services from the vendor to the user/consumer.

Referring now to FIG. 1, there is shown the architectural overview and design of the main software components for use with the inventive process described herein. More particularly, the user is operating on an instant messaging system which is shown as the AOL IM system by way of example. The instant messaging software communicates directly with the Vendor's Application software located on the vendor's computer. The instant messaging software also communicates with a Web Browser which is used to retrieve the list of goods and/or services from a server which in a restaurant example is a menu.

The Vendor Application contains a Remote Data Access Layer for communication with the server as well as a Web Server module which "listens" for information that the server wants to send to the Vendor Application software.

The server contains five elements as shown in FIG. 1. Data representing the list of goods and/or services, orders placed by the user and other data for use with the ordering system is stored in the Physical Data Base. The Local Data Access Layer is a software module used to create, update and delete information stored in the Physical Data Base. The Web Server module executes the various software applications including the Web Application used to communicate with and generate the data that is shown to the user by the Web Browser, which interfaces with the instant messaging software. The Remoting Service module is used to communicate with the Vendor Application Software.

The architecture shown in FIG. 1 is designed to permit scalability of the inventive ordering system so that essentially an unlimited number of IM users can sign on and use the system. Simultaneous use of the system is possible for a large number of users allowing the vendor to service multiple users without the delays inherent with prior art ordering systems.

Figure 2A:
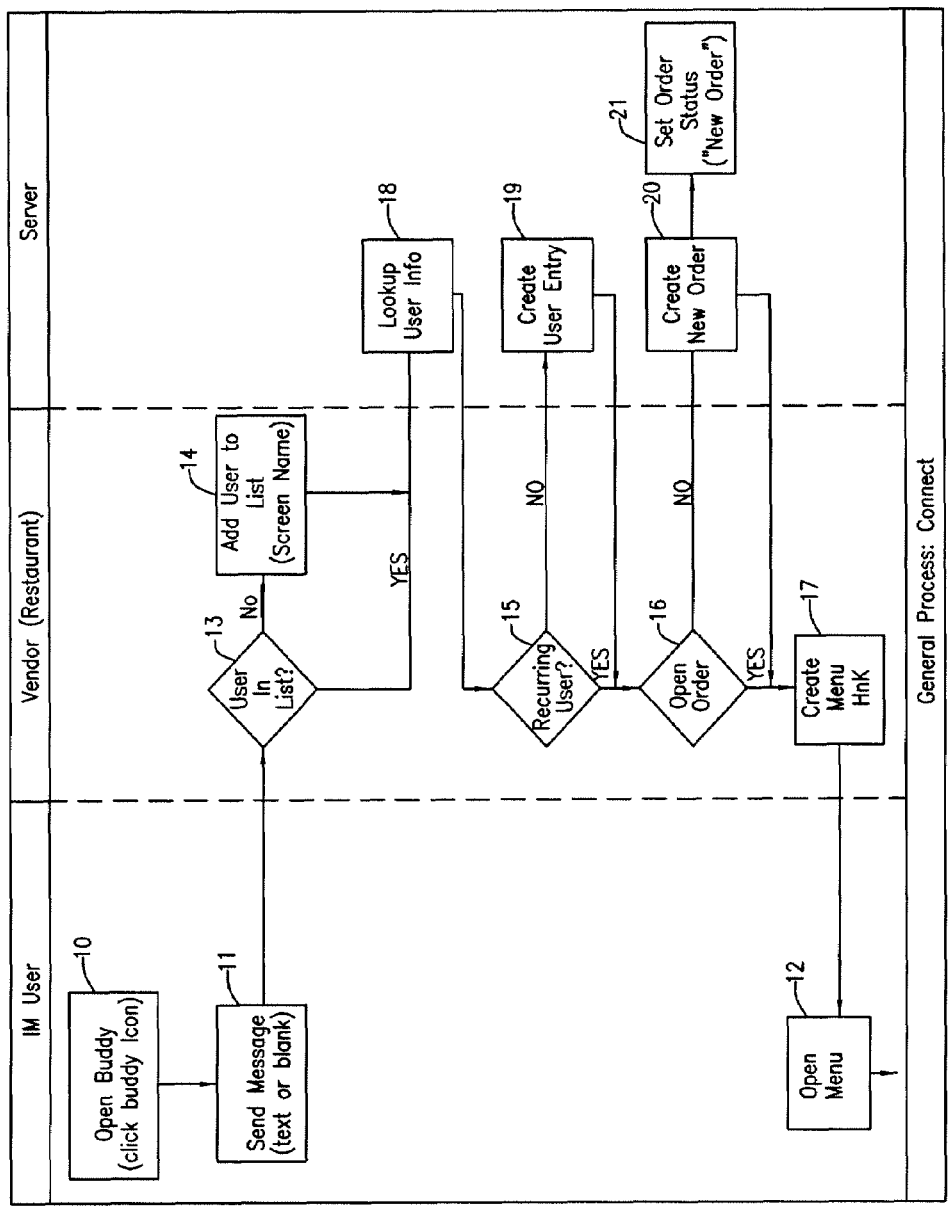
FIGS. 2A-2C illustrate a flow chart setting forth the process steps in accordance with a first embodiment of the invention.
Figure 2B:
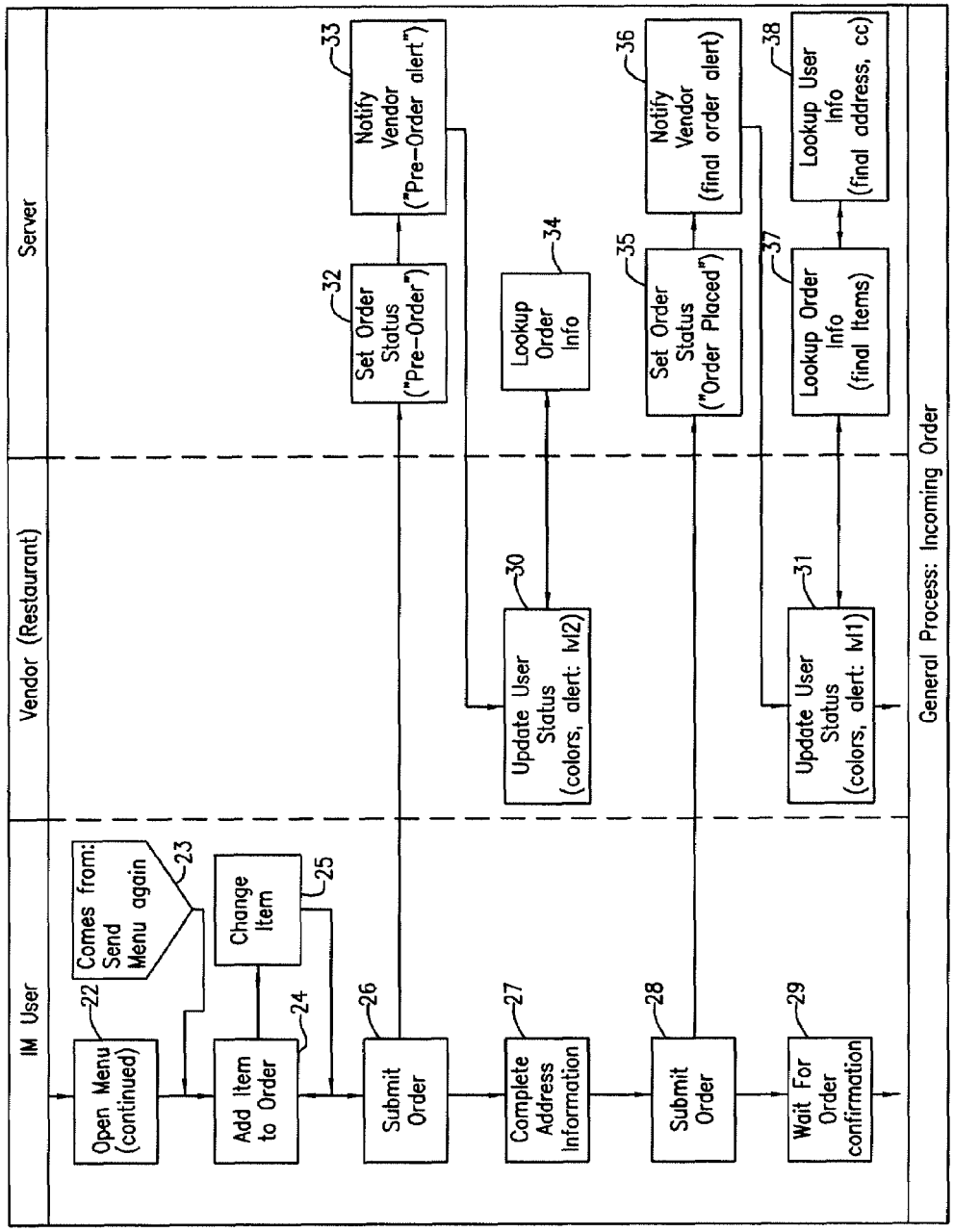
Figure 2C:
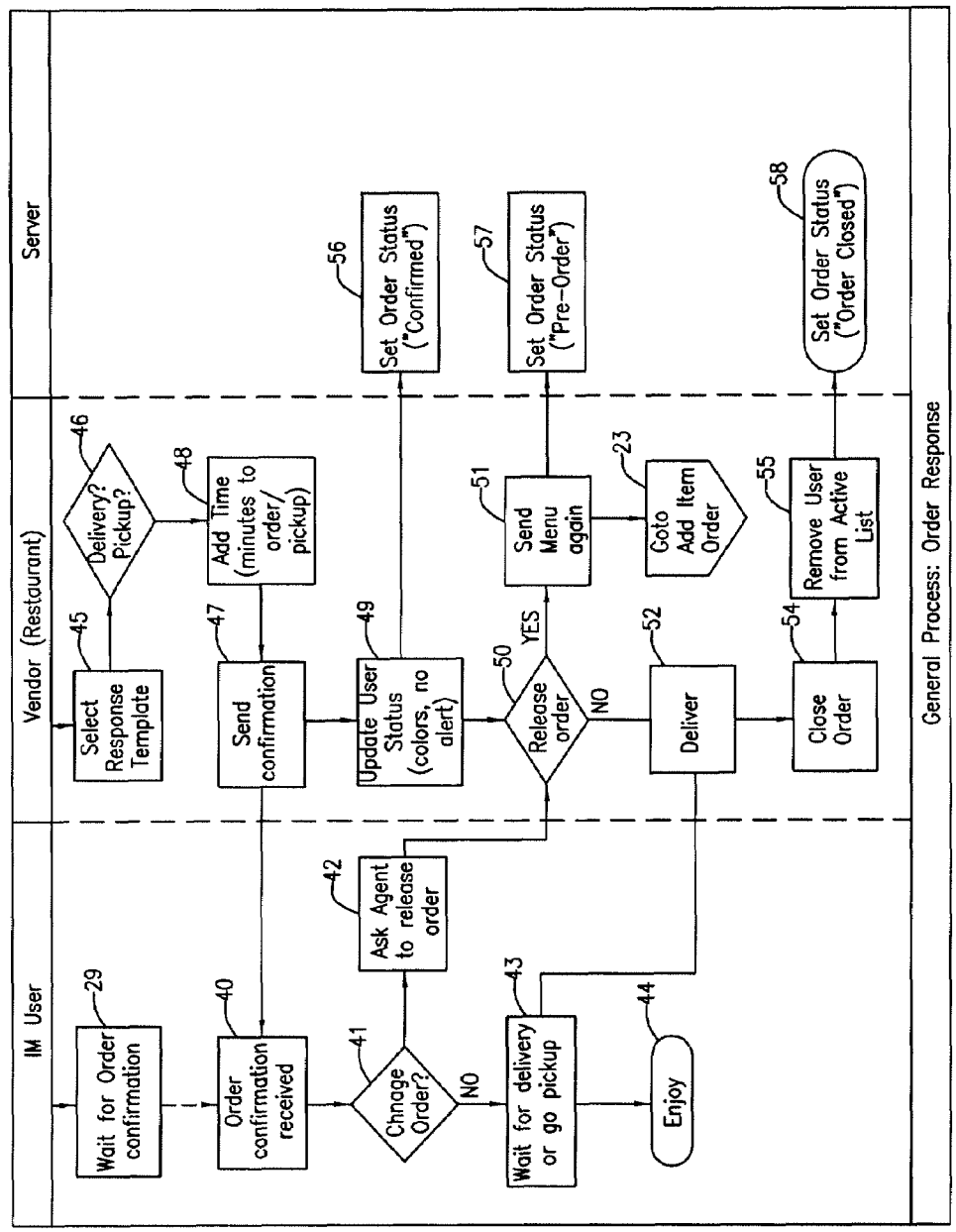

Referencing now to FIGS. 2A-2C there is shown a flow chart which sets forth a first operative embodiment of the present invention. FIGS. 2A-2C show what occurs at the user's computer, the vendor's computer, in this case a restaurant, and at the server. This format tracks the description shown in FIG. 1.

More particularly, the ordering procedure begins with the user clicking on the restaurant's screen name at 10 and sending a message at 11 to decision block 13. If the user has previously used the inventive ordering process, the user information is retrieved from server at 18. If the user is a first time user, his screen name is added to the user list in the vendor's computer at 14. At 15 it is determined if the user is a recurring user, and if not, a new user file is created at 19. If the user is a repeat user, or after the user's information has been stored, a decision is made at 16 whether this is a new order or an order change. If a new order, the menu is assembled at the server at 20 and a "New Order" status is set in the server at 21. For either a new order or a changed order the menu link is created at 17 and sent to the user at 12 which opens the menu at the user's computer.

Once a new order is created at 20 it is important that this order be uniquely identified throughout the ordering process. This is important for two reasons. One, the order being processed must be identified with the specific user and the specific vendor involved with this particular order as the inventive system is designed to handle essentially simultaneous orders to one vendor from multiple users and one user can process essentially simultaneous orders to more than one vendor. Two, when the menu link is sent to the user it is important that this link relate only to the order being processed at that time. Otherwise, the user could copy and paste the link and attempt to place new orders based only on the link which could be detrimental to operation of the inventive system.

To avoid these two potential problems an order identification number is generated at step 20 which references information from the user's screen name, the vendor's screen name and information generated by the software. The order identification number is unique to the particular order in progress and ties together information from the user screen name, the vendor screen name and information stored on the server. After a particular order is completed and closed, the user identification number is cancelled and a new order identification number is generated for the next order. In this way every order is uniquely identified during the ordering process to keep track of simultaneous orders and a user cannot use a copies menu link to disrupt operation of the inventive system.

Referring to FIG. 2B, the menu is received at 22 and the user can select items from the menu at 24 or change an item on a previous order at 25. The order is submitted by the user at 26 and sent to the server where a "Pre-Order" status is set at 32. The "Pre-Order" alert is generated by the server at 33, sent to the vendor and the changed status is indicated on the vendor's computer at 30 which will be further described below. The initial order information is then retrieved from the server at 34 and displayed on the vendor's computer.

At this time the user completes his contact information at 27 and submits the final order at 28. The submit order signal is sent to the server which updates the order status to "Order Placed" at 35. The server notifies the vendor at 36 and the vendor's computer displays the new status at 31. At this time the server looks up the order information, and the user's contact information at 37 and 38, respectively. The user at this time is waiting for order confirmation at 29.

Referring now to FIG. 2C, after the user status is updated at 31 (FIG. 2B), the vendor at 45 selects an appropriate response template to send to the user, the vendor recognizes the order as either a Delivery or Pick Up order at 46, and selects the estimated time for delivery at 48. This information is then sent to the user at 47 as part of the order confirmation and received by the user at 40. The vendor's computer updates the order status at 49 as well as changing the order status in the server at 56.

If the user wants to change the order, he can do so at 41 by sending a message to the vendor at 42. The vendor's computer then releases the order at 50, and, if necessary, can resend the menu at 51 to restart the ordering process at 23 as described above. If it is not necessary to release the order, the vendor can initiate delivery at 52, close the order at 54, remove the user from the active list at 55 and instruct the server to close the order at 58. The user then waits for delivery at 43 or picks up the items he has ordered. Block 44 indicates that the order has been picked up or delivered.

It is to be understood that after an order is received by a vendor, it can be printed and provided to the vendor's kitchen facility in the restaurant or the data generated by the order can be integrated with a vendor's Point-Of-Sale (POS) software for order processing. The Vendor Application software can run on a stand-alone computer at the vendor's facility or the Vendor Application software can be integrated with POS software already being used by a vendor. Also, the vendor's software can be modified to add features and attributes unique to a particular vendor as will be understood by one skilled in this technical area Referring now to FIGS. 3A-3E, there is shown a flow chart which sets forth a second operative embodiment of the present invention. The first embodiment described above covered an ordering process in which the user selected items from a web based menu stored in the server. In the embodiment described in FIGS. 3A-3E, the user can create a "favorites list," order from an IM based menu, or order from a web based menu. In addition, the vendor can exclude users if they are beyond the vendor's delivery area.

Figure 3A:
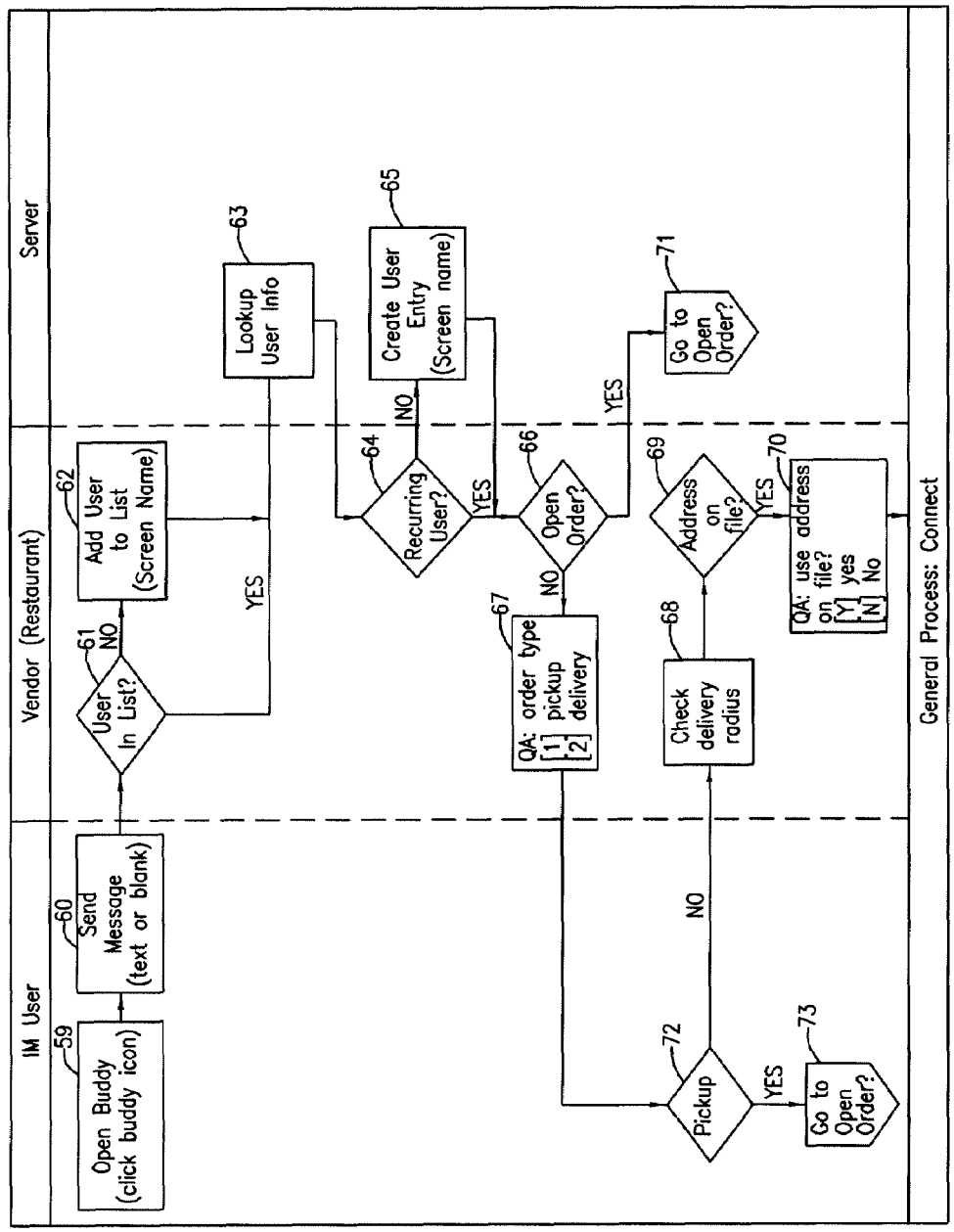
FIGS. 3A-3E illustrate a flow chart setting forth the process steps in accordance with a second embodiment of the invention; and, FIGS. 4A-4L illustrate screen shots showing examples of the computer displays for both the vendor and consumer as the inventive method is utilized.

Referring now to FIG. 3A, steps 59-65 are the same as described above in FIG. 2A for steps 10, 11, 13, 14, 15, 18, and 19. However, at step 66 in FIG. 3A the vendor's computer checks to see if there is an open order for this particular user. If there is an open order, the process proceeds to step 71 and from there to step 85 (FIG. 3B) which will be explained below.

Figure 3B:
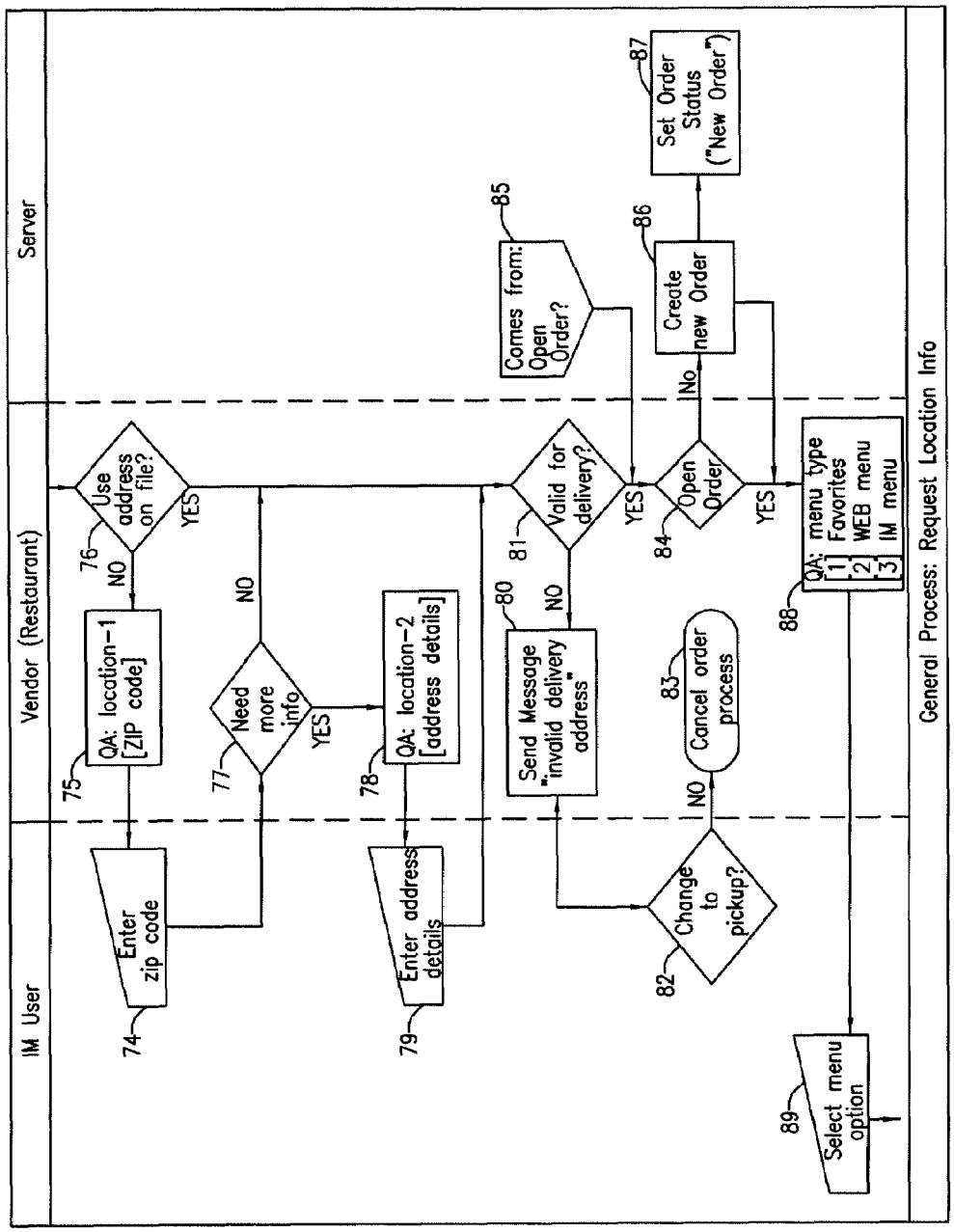

If there is no open order, the vendor's computer at 67 queries the user as to whether the order will be a pick up or a delivery order at 67. If the user chooses pick up, the process proceeds to 72, 73 and from there to step 85 (FIG. 3B). If the user chooses delivery, the process moves to step 68 where the vendor's computer initiates a delivery radius check at 68. The vendor's computer then checks to see if the user's address is on file at 69 and 70.

Referring now to FIG. 3B, the vendor's computer at 76 makes the decision on whether or not the user's address is on file in the vendor's computer. If the address is not on file, the vendor's computer at 75 asks the user for the user's zip code which the user supplies at 74. The vendor's computer at 77 determines if additional information is necessary, and if not, the process moves to step 81. If more information is required, the user is asked for address details at 78 by the vendor's computer and this information is supplied by the user at 79.

The vendor's computer then determines at step 81 whether the user has a valid address for a delivery order. If so, the order is opened at 84, a new order is created by the server at 86, and the "New Order" status is set at 87. If there is an open order or after a new order is created, the process moves to step 88.

If the delivery address is not valid, a message is sent to the user at step 80 and the user then has the choice on whether to change the order to a pick up order at 82 or the order is cancelled by the vendor at 83. If the order is changed to a pick-up order, the order can be processed in accordance with the description set forth in FIGS. 2A-2C.

At step 88 the vendor's computer generates a query as to the type of menu the user wants to choose from and the user is instructed to choose one of three options at 89, a "favorites" menu, a web based menu or an IM menu. As indicated at 88 this choice can be made by choosing one of the options one through three.

Figure 3C:
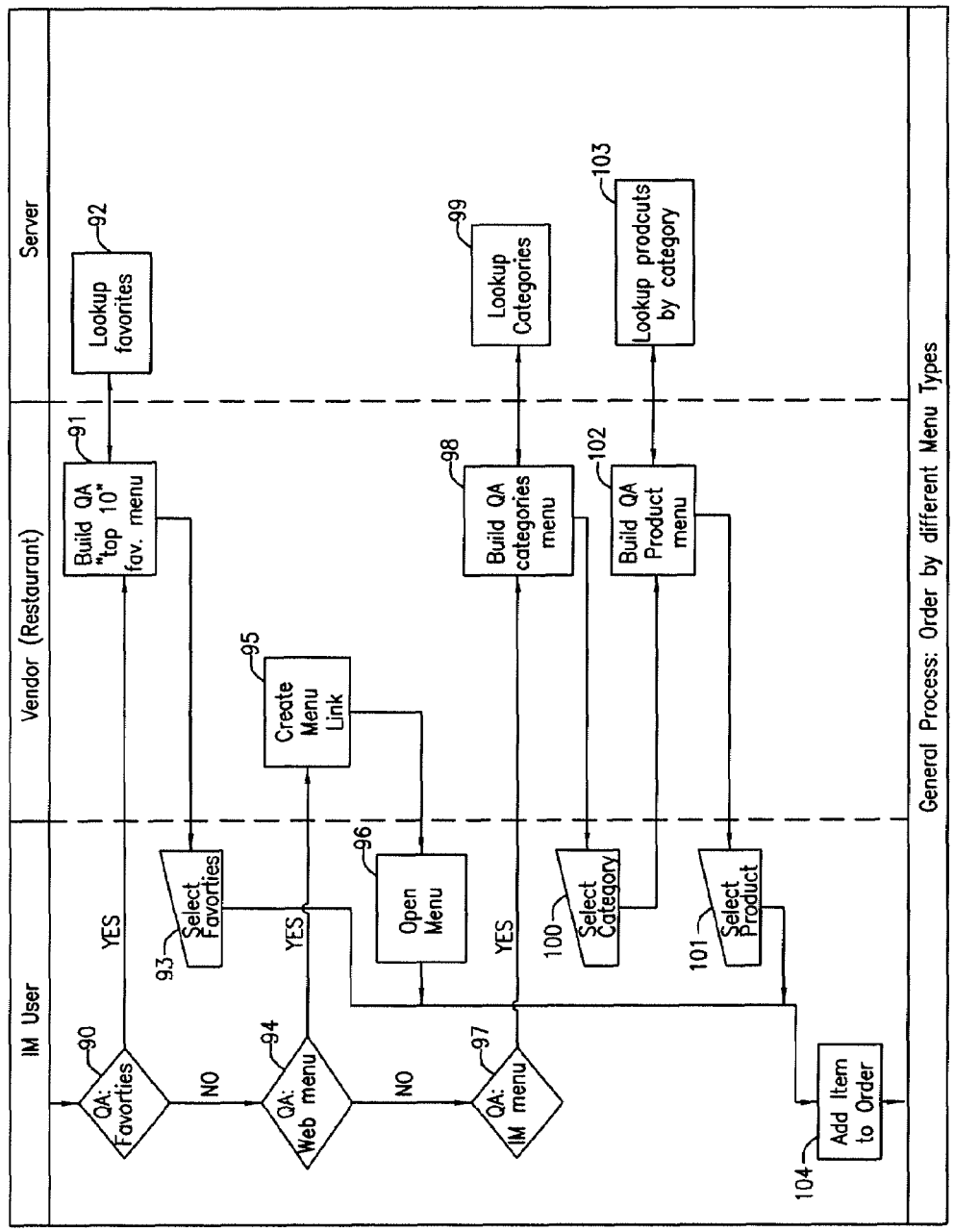

Referring now to FIG. 3C, the user decides at step 90 whether he wants to choose from a "favorites" list. If so, the vendor's computer retrieves a "favorites" list from the server at step 91 which has been previously stored on the server at step 92. It is to be understood that a user's "favorites" list will be comprised of a list of items chosen from the restaurant's main menu which are favored by the user.

The user's "favorites" list is displayed to the user and the user can select from the list at step 93. That selection is then added to the user's order at step 104.

If the user does not select a "favorites" menu at step 90, the user has the option of selecting a web based menu at step 94. If a web based menu is selected, the menu web link is created at step 95 by the vendor's computer. The menu is opened for the user at step 96, and the items selected by the user are added to the order at step 104. Selection from the web based menu operates in accordance with the description set forth in FIGS. 2A-2C.

If the user does not choose a web based menu at step 94, he can select the IM menu option at step 97. The IM menu can be of different formats, but the example described in FIG. 3C assumes that the IM menu is based on selected food categories present within the main menu. For example, the main menu can be divided into categories such as salads, pasta, pizza, etc. The IM menu would then provide the user with a list of categories from which to choose and when clicking on a particular category, the user would be able to choose from the items within the chosen category.

Upon choosing the IM menu option, the vendor's computer at 98 queries the server which provides the various menu categories available at step 99. Once retrieved from the server, the categories are presented to the user at step 100 where the user can select a particular category and provide the selected category to the vendor's computer. The vendor's computer at step 102 queries the server to determine the food products in the selected category which are retrieved from the server at step 103. The list of products within the category is provided to the user at step 101 and after the user makes a selection from the category, the item selected is added to the menu at step 104.

Figure 3D:
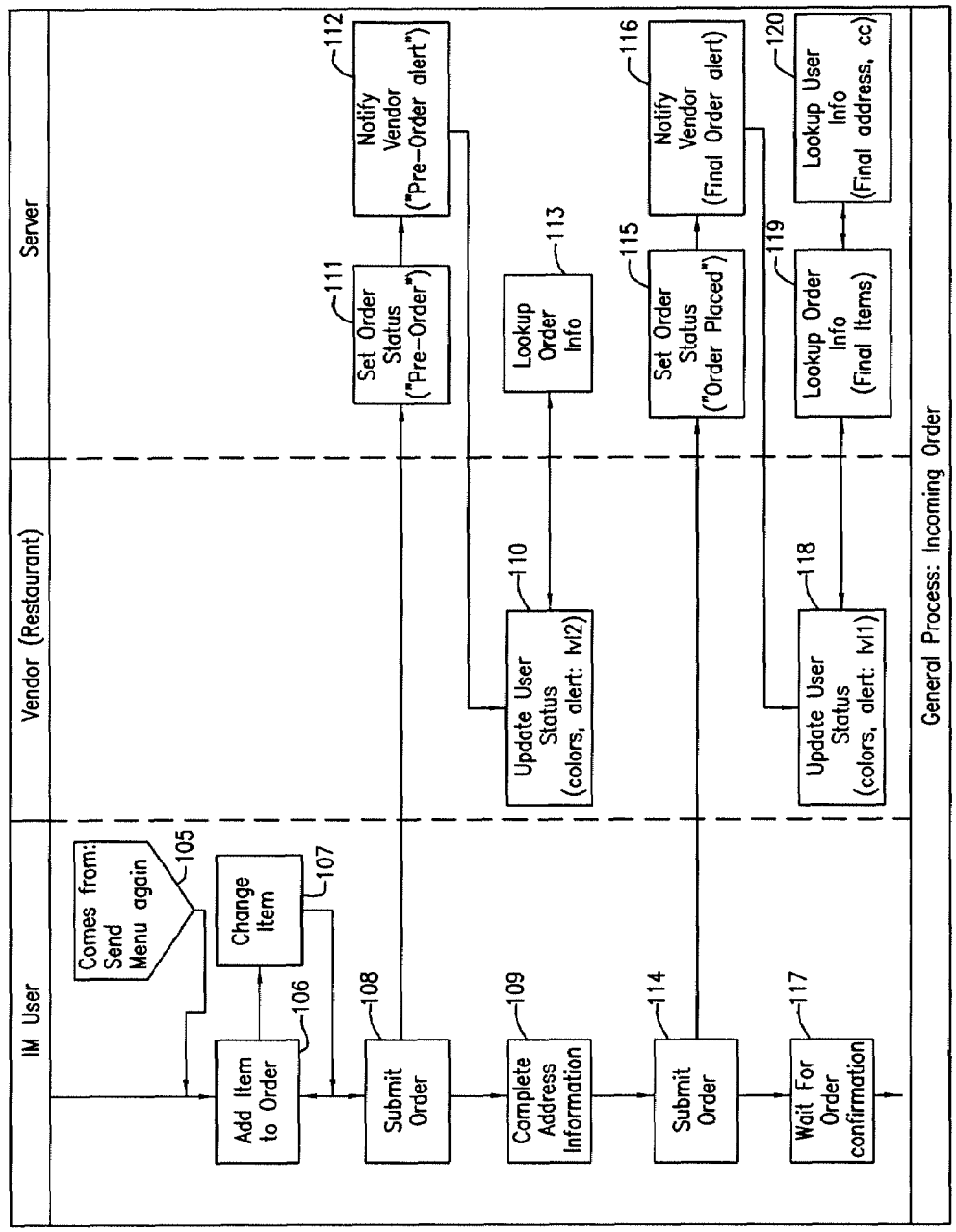
Figure 3E:
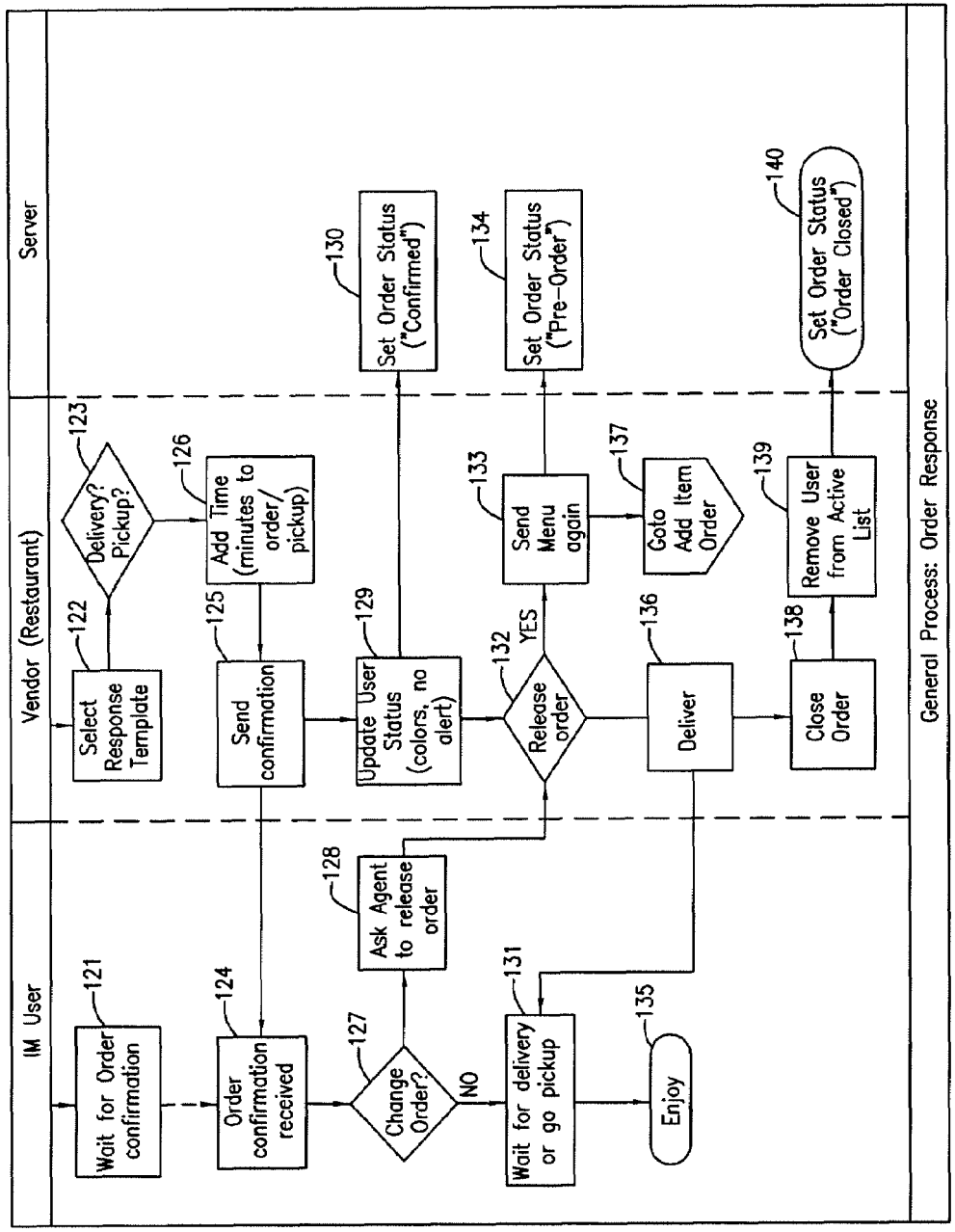

Referring now to FIG. 3D, the process steps 105-120 operate in the same manner as the process steps 23-38 which have been described above in FIG. 2B. Similarly, in FIG. 3E, the process steps 121-140 operate in the same manner as the process steps 39-58 which have been described above in FIG. 2C. Therefore, the previously described process steps will not be repeated here.

Referring now to FIGS. 4A-4L, there is shown screen shots of what the computer screens show for the user/consumer and the vendor as an ordering process is completed. It is to be understood that FIGS. 2A-2L show a basic ordering process for a restaurant and that various enhancements and additions to the various features can be added to the ordering process. Also other vendors, in addition to a restaurant, may use the inventive process without detracting from the spirit and scope of the invention.

Figure 4A:
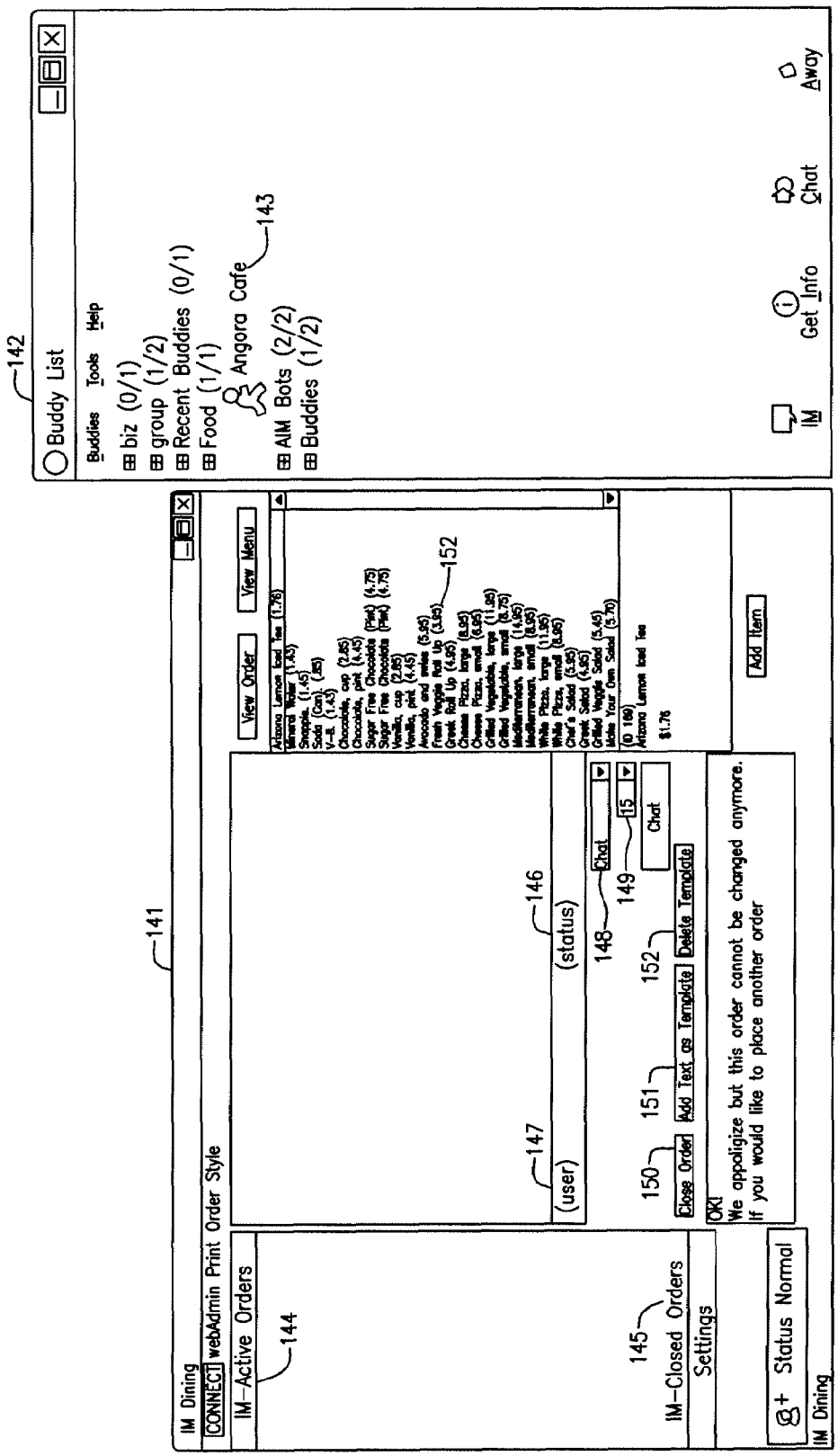

More particularly referring to FIG. 4A, there is shown at 141 what a vendor will see on his computer screen and at 142 what a user/consumer will see on his computer screen.

The user/consumer screen shot at 142 is an example of the inventive ordering method being used with an AMERICA ONLINE (AOL) instant messaging platform. The screen shot at 142 shows a "buddy list" with a restaurant, The Angora Café, listed as one of the "buddies" on the user's buddy list. The term "buddy list" is used by AOL, and it is to be understood that this term as used herein is interchangeable with the term "contact list," also used herein.

On the vendor's screen shot at 141 there are shown various features and buttons which allow the vendor to process an order. At 144 is an "Active Order" list which indicates active orders as will be described below. At 145 is the "closed order" file which keeps track of all orders after the order is completed. A user identification is shown at 147 while the status of the order is shown at 146. The box at 148 shows the ordering mode and the box at 149 is a drop down menu that allows the vendor to choose the time for pick up or delivery. The boxes at 150, 151 and 152, respectfully allow the vendor to close an order, add new text for a pre-set template, as explained below, or delete a pre-set template. The listing at 153 is an example of a complete menu for a restaurant/vendor which is displayed on the vendor's screen.

Figure 4B:
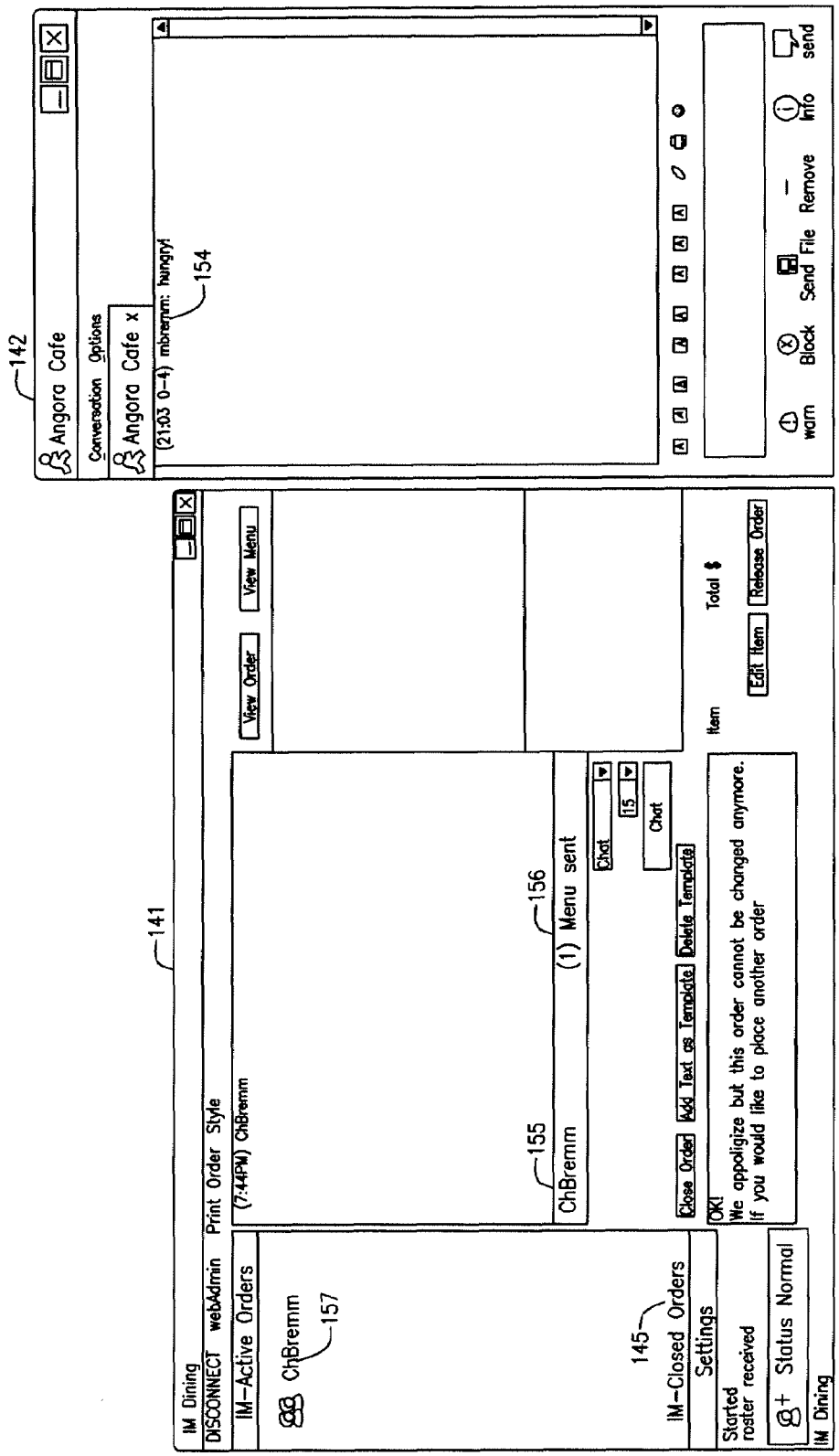

The user initiates the ordering process by clicking on the "Angora Café" icon (screen name) in the "Buddy List" shown on FIG. 4A. As shown in FIG. 4B the IM buddy list then shows that Angora Café has been selected and the user sends an initiation message to open the IM communication channel. Any message can be used for the initiation message, including pressing any key plus the enter Key. The example shown in FIG. 4B at 154 is that the user "mbremm" sends the message "hungry" to open the communication channel.

The vendor's screen at 141 shows by way of example that another user "cbremm" is already on line as shown by the icon at 157 and the user's name at 155. Shown at 156 is the fact that a menu has already been sent to "cbremm" as will be further detailed below.

Figure 4C:
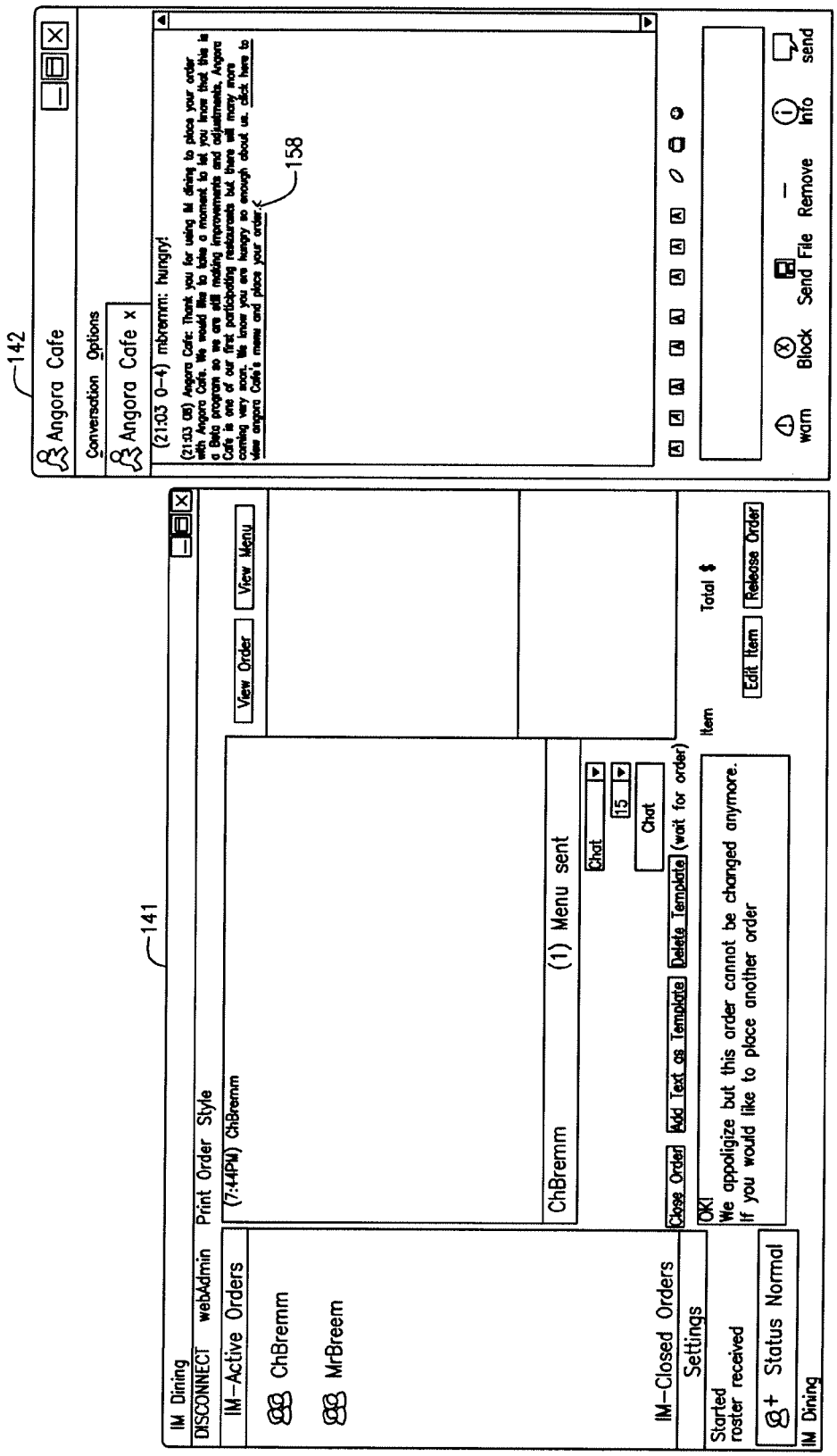

Referring now to FIG. 4C and the user's IM screen at 142 it can be seen that the user has been placed in contact with The Angora Café restaurant, has received an opening greeting message at 158 and has been directed to click on the designated portion of the opening message to receive a menu from The Angora Café. It is important to note that simply clicking on The Angora Café icon which was placed on the user's buddy list by the user and opening the IM communication channel with an initiation message was all that was required by the user to gain access to The Angora Café menu. As described above, the software installed on the vendor's computer controls this process. It can also be seen that an "mbremm" icon has appeared on the vendor's screen 141 indicating to the vendor that he is in IM contact with user "mbremm."

Figure 4D:
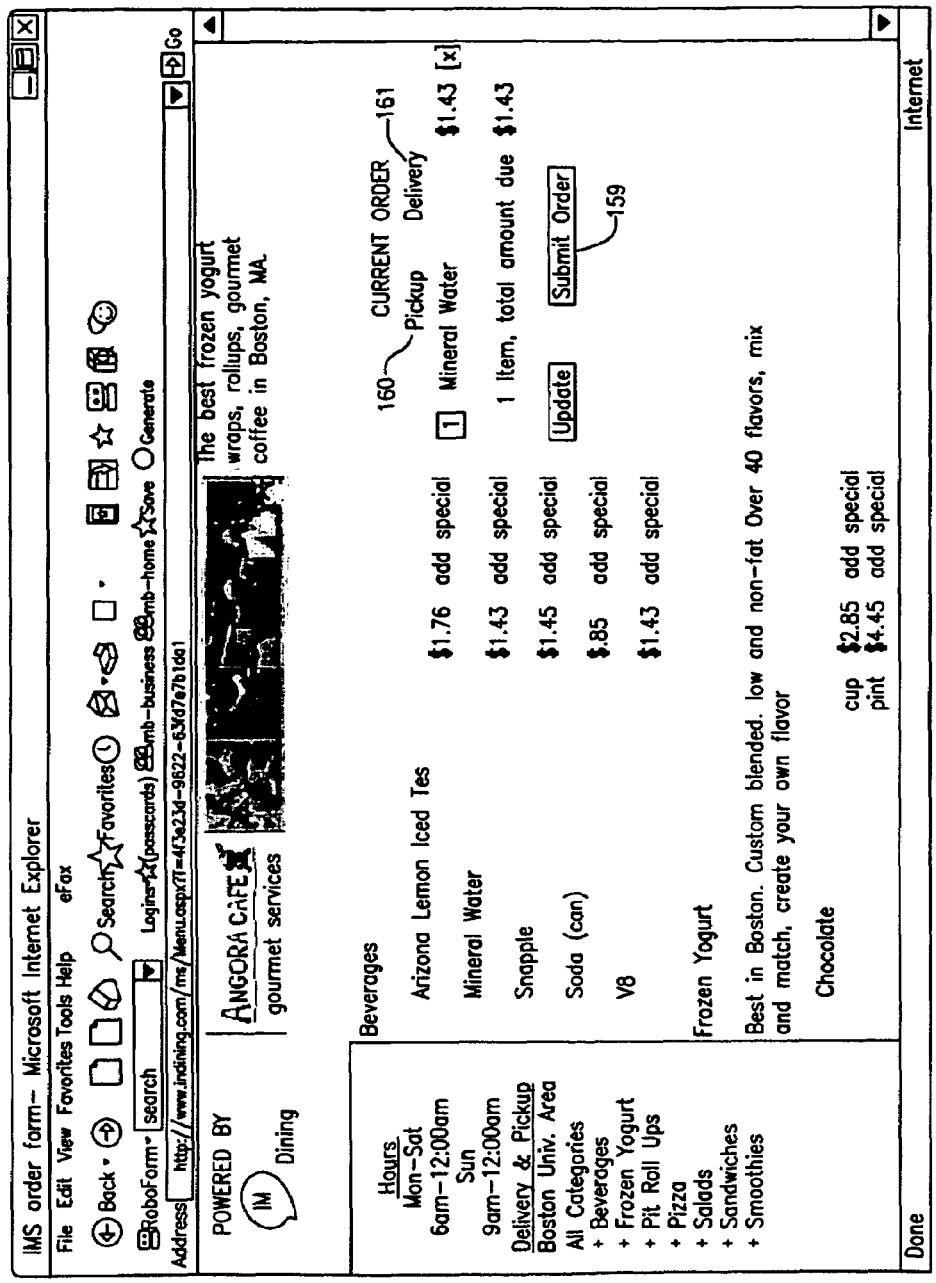

Referring now to FIG. 4D, there is illustrated the menu which has been received and displayed to the user "mbremm" after clicking on the appropriate portion of the message shown in FIG. 4C. The user selects items from the menu by clicking on the desired item. As shown in FIG. 4D the user has selected mineral water which is then displayed under the Current Order heading. The user can also indicate whether he wants pick up or delivery at 160 and 161 and can submit his order by clicking on the "Submit Order" button at 159.

Figure 4E:
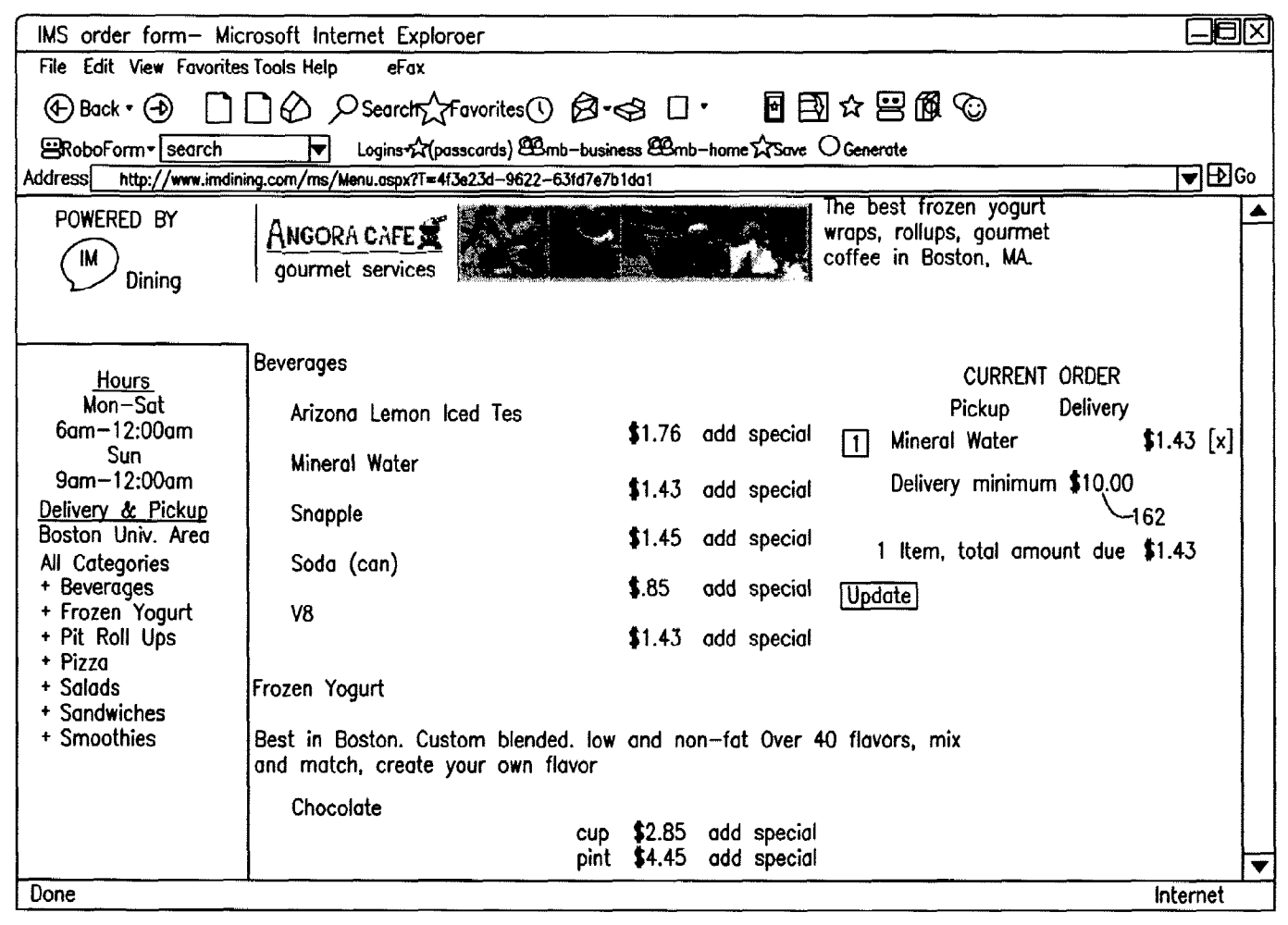

FIG. 4E illustrates one of the many features that can be included in the vendor's software by way of example. FIG. 4E shows that the vendor can indicate to the user that there is a minimum delivery charge as shown at 162. It is to be understood that the flexibility of the software installed at the vendor's computer will allow numerous features to be included in any ordering process to make the ordering process convenient to the user and the vendor.

FIG. 4F illustrates at 163 and 164 that the user has added two items to his list in response to the minimum delivery requirement with the two items being a large pizza for $4.95 and a tossed salad for $4.45. At this point, if the user's order is complete, he can click on the submit order button which will take the user to the screen shown in FIG. 4G. As described above, clicking on the submit order button will send a "Pre-Order" signal to the vendor's computer to signify to the vendor that an order is in progress.

Figure 4G:
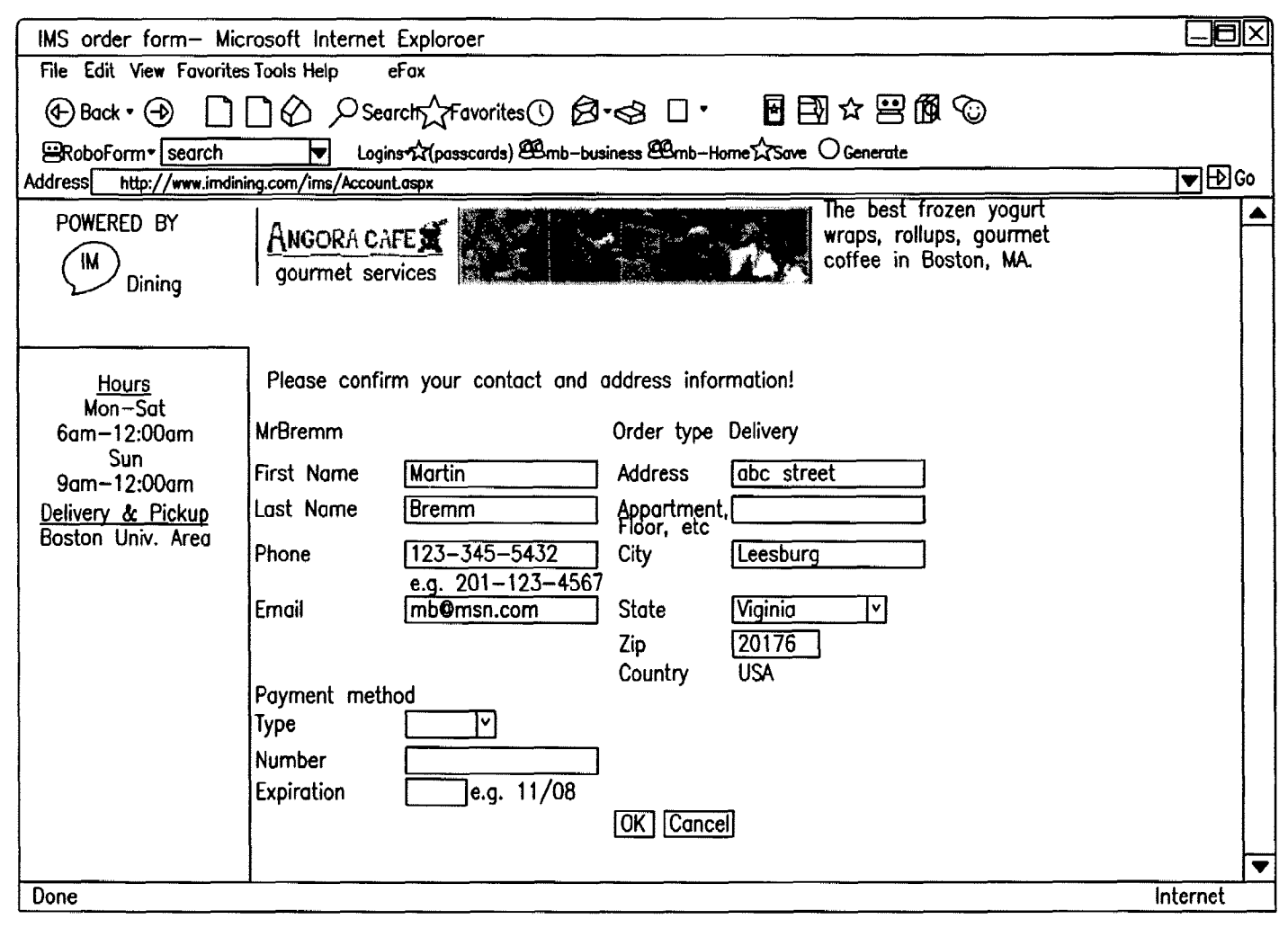

As shown in FIG. 4G, the user is now presented with a screen requesting contact information after he submits his order. After providing the requested information, the user clicks on the "OK" button to continue the process. It is to be understood that contact information can be stored and automatically retrieved for repeat users. The user then receives a message from the vendor confirming that the user's order is being processed as shown in FIG. 4H.

Figure 4I:
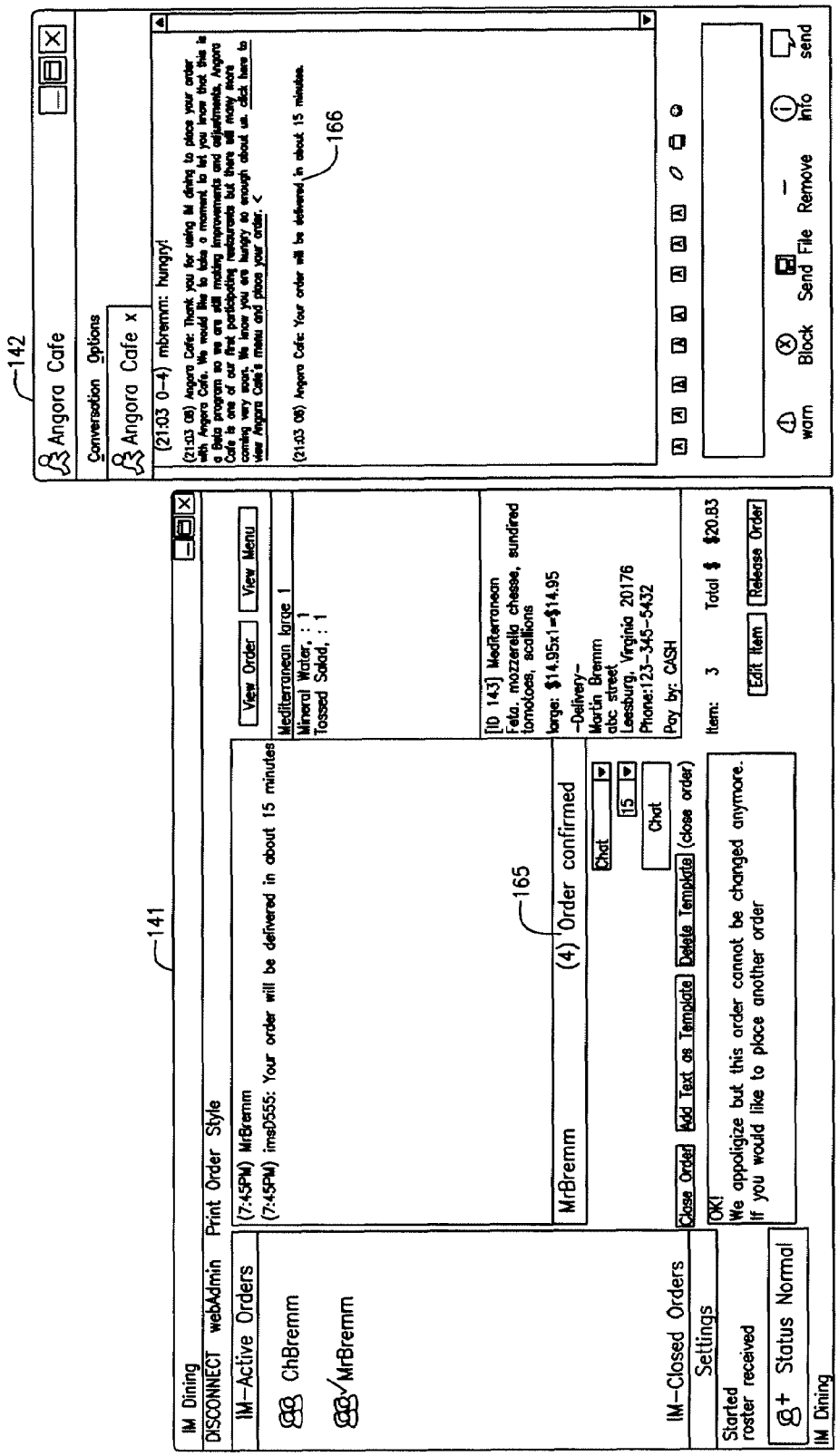
Figure 4J:
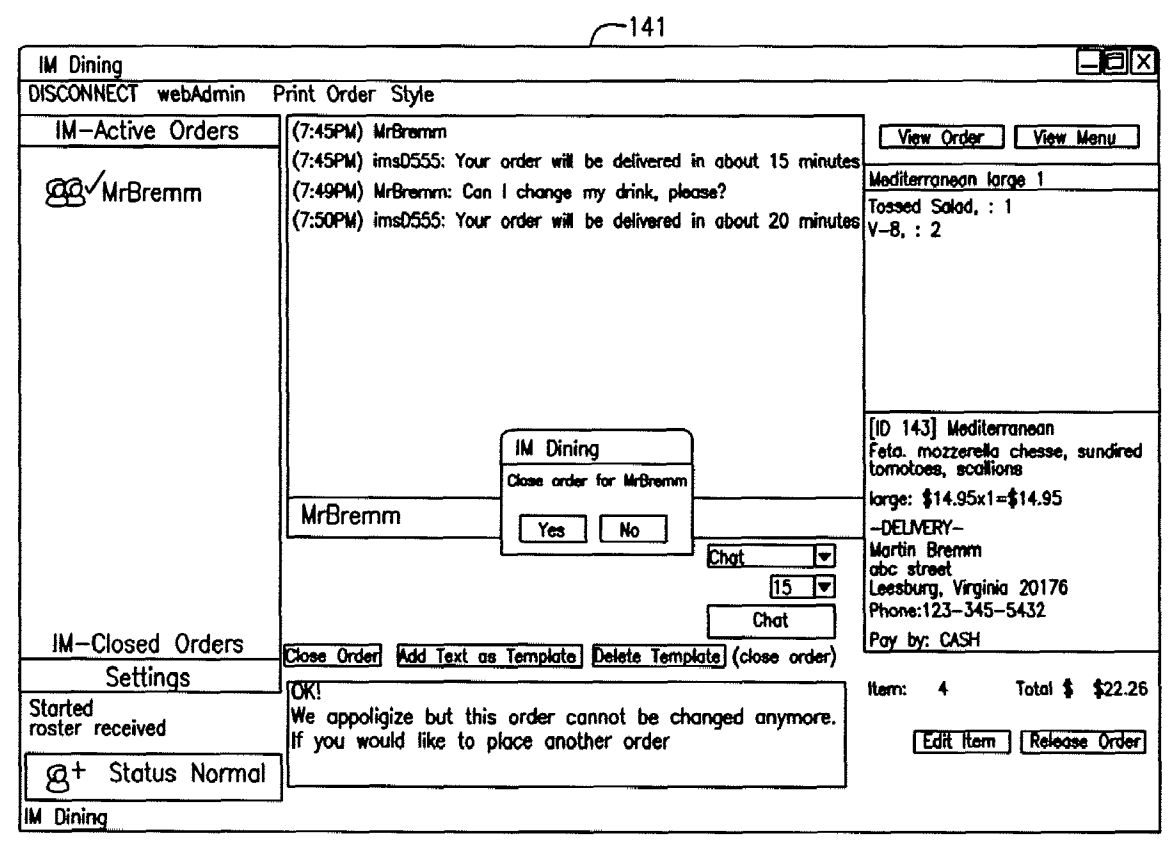

In FIG. 4I the vendor's screen 141 shows that the order has been confirmed at 165. In addition the vendor has indicated to the user the delivery time as shown at 166 on user screen 142. Note that the vendor screen also displays to the vendor the complete order and the delivery and payment method. At this point the vendor can close the order as shown in FIG. 4J if the ordering process is complete.

Figure 4K:
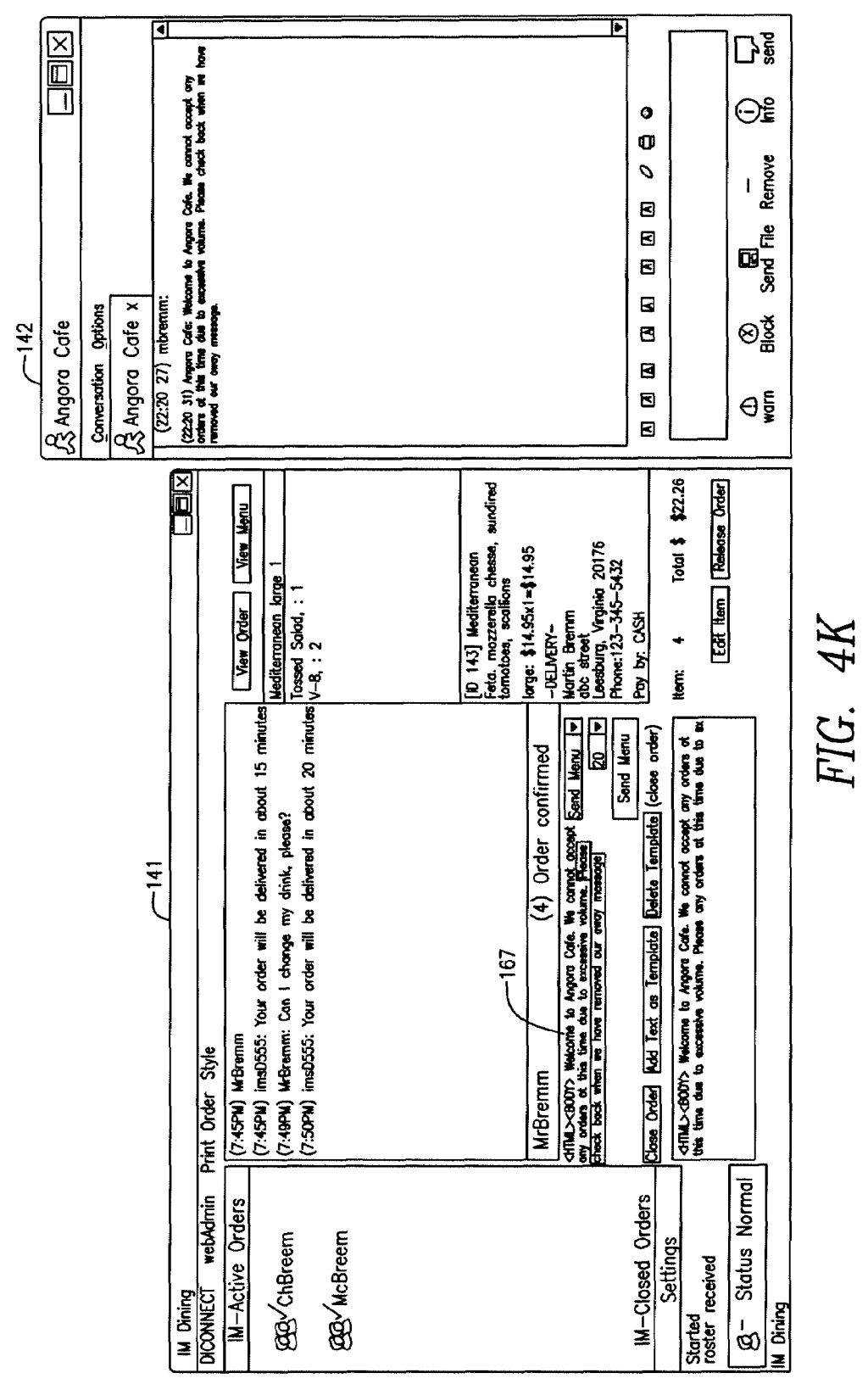
Figure 4L:
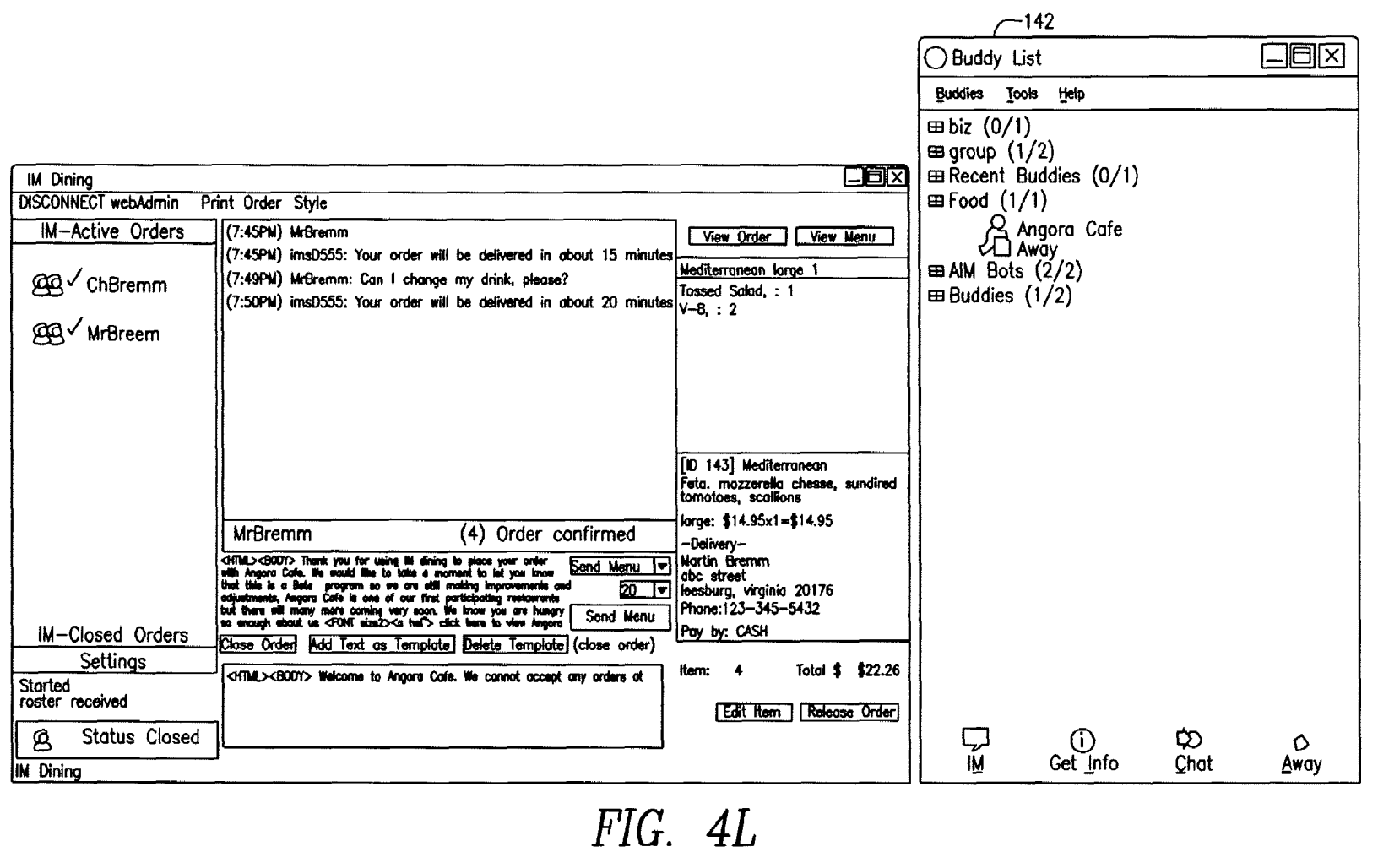

FIGS. 4K and 4L illustrate another one of the many features that can be provided with the vendor's software. For example the vendor can generate a template to notify the user that no orders are being taken as shown at 167 on vendor screen 141. This message will be sent to the user's screen at 142 as shown in FIG. 4K. This status can also indicate to other potential users that orders are not being taken as shown on user screen 142 in FIG. 4L where The Angora Café icon shows an "away" message.

The foregoing FIGS. 4A through 4L show only one example of the basic ordering process possible with the invention described herein. It is to be understood that the key to the inventive ordering process is the ability to utilize the direct contact between user and vendor possible with instant messaging. With both vendor and user signed on with an instant messaging service, the user can receive a listing of all goods and/or services available from the vendor by simply clicking on the vendor's screen name and sending an initiation message. The software present in the vendor's computer can be customized for any specific application of providing goods and/or services and the vendor software can be tailored to make the ordering process easy and convenient for both the user and the vendor.

The description of certain embodiments of this invention is intended to be illustrative and not limiting. Numerous other embodiments will be apparent to those skilled in the art, all of which are included within the broad scope of this invention. For example, Point-Of-Sale (POS) software is in use by virtually all larger take-out food establishments and restaurant chains as well as vendors selling goods and/or services in categories other than restaurants. The inventive ordering system described herein can be readily integrated with existing POS systems already being used by a vendor or can be implemented in a stand-alone computer located at the vendor's facility. Also, the Vendor's Application software can be readily modified to provide features and attributes unique to a particular vendor. It is to be understood that the claims set forth herein cover all such alternative embodiments of the present invention.

What is claimed is:

1. A method performed by a computer system comprising the steps of:

storing a vendor's list of goods and/or services in a database accessible by the computer system;

establishing an instant message communication between a user apparatus and a vendor apparatus both the user and the vendor identified by unique screen names on contact lists residing at both the user apparatus and the vendor apparatus, the establishing occurring by selecting the vendor from the contact list;

presenting and displaying the vendor's list of goods and/or services to the user in response to the establishment of the instant message communication, ordering by the user of specific selected items from the vendor's list of goods and/or services through use of the instant message communication;

generating a unique order identification number which references information from the user's screen name, the vendor's screen name and information generated by the computer system;

using the user's screen name to determine whether the user is a repeat user and if the user is a repeat user, using the user's screen name to determine whether the user's order is a new order or an order change; if the order is an order change, retrieving and updating the order using the order identification number; if the order is a new order, storing the order and corresponding order identification number; if the user is not a repeat customer, adding the user's screen name to the vendor's contact list; and using the order identification number to identify and track a specific order placed by the user from the list of goods and/or services.

2. The method of claim 1 further comprising arranging for the ordered goods or services to be put in the possession of the user.

3. The method of claim 1 further comprising declining to accept an order for goods or services from an individual user if the individual user's order is not accompanied by a valid order identification number.

4. The method of claim 1 wherein the database further comprises a user account record associated with the user's screen name, the account record having information about the user, and the method further comprises using the user's screen name to identify the user account record and to retrieve information about the user from the identified user account.

5. The method of claim 1 wherein the method further comprises using the user screen name to transmit at least one further instant message to the user about said order for goods or services received from the user.

6. A system for a user to order selected goods and/or services from a list of goods and/or services provided by a vendor through use of instant message communication between the user and the vendor comprising:

a user apparatus operable to receive and transmit instant messages, to keep a contacts list, and to establish an instant message communication with a vendor apparatus by selecting a vendor name from the contact list;

the vendor apparatus operable to receive and transmit instant messages and to keep a contacts list;

a database for storing the vendor's list of goods and/or services;

a computing unit configured to present and display the vendor's list of goods and/or services to the user in response to the instant message communication;

the computing unit further configured to receive through use of the instant message communication orders placed by the user by selecting specific items from the vendor's list of goods/services;

the computing unit further configured to generate a unique order identification number which references information from the user's screen name, the vendor's screen name and information generated by the computing unit; and the computing unit further configured to use the user's screen name to determine whether the user is a repeat user and if the user is a repeat user, use the user's screen name to determine whether the user's order is a new order or an order change; if the order is an order change, retrieve and update the order using the order identification number; if the order is a new order, store the order and corresponding order identification number; if the user is not a repeat customer, add the user's screen name to the vendor's contact list; and the computing unit further configured to use the order identification number to identify and track a specific order placed by the user from the list of goods and/or services.

7. The system in accordance with claim 6 wherein the computing unit is further configured to decline acceptance of an order for goods and/or services from the user if the user's order is not accompanied by a valid order identification number.

8. The system in accordance with claim 6 wherein the database includes user accounts each having at least one associated screen name and wherein the computing unit automatically establishes a user account for the user upon receipt of the instant message communication from the user if the database does not already include a user account associated with the user's screen name.

* * * * *